United States Patent
Hallenstål et al.

(10) Patent No.: US 8,543,114 B2
(45) Date of Patent: Sep. 24, 2013

(54) VOICE OVER LTE VIA GENERIC ACCESS HANDOVER (HO) APPARATUS AND METHOD

(75) Inventors: Magnus Hallenstål, Täby (SE); Göran Rune, Linköping (SE); Jari Vikberg, Järna (SE); Håkan Axelsson, Linköping (SE); Thomas Johansson, Åby (SE); Tomas Nylander, Värmdö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 214 days.

(21) Appl. No.: 13/124,282

(22) PCT Filed: Sep. 13, 2009

(86) PCT No.: PCT/SE2009/051164
§ 371 (c)(1),
(2), (4) Date: Apr. 14, 2011

(87) PCT Pub. No.: WO2010/044737
PCT Pub. Date: Apr. 22, 2010

(65) Prior Publication Data
US 2011/0207462 A1    Aug. 25, 2011

Related U.S. Application Data

(60) Provisional application No. 61/105,623, filed on Oct. 15, 2008, provisional application No. 61/140,393, filed on Dec. 23, 2008, provisional application No. 61/150,041, filed on Feb. 5, 2009.

(51) Int. Cl.
*H04W 36/00* (2009.01)

(52) U.S. Cl.
USPC .......................................... 455/436

(58) Field of Classification Search
USPC ........ 455/435.1, 436, 404.1, 456.1; 370/356, 370/331, 221, 328, 310, 254, 352
See application file for complete search history.

(56) References Cited

U.S. PATENT DOCUMENTS

2008/0214190 A1* 9/2008 Aalto .................. 455/435.1
2009/0268635 A1 10/2009 Gallagher

OTHER PUBLICATIONS

VoLGA Forum: "Voice over LTE via Generic Access; Stage 2 Specification; Phase1" VoLGA Stage 2 Aug. 24, 2009, pp. 1-89, XP002564629 Retrieved from the Internet: URL:http://www.volga-forum.com/downloads/VoLGA-Stage2_Spec_v1.2.0.pdf> [retrieved on Jan. 21, 2010] p. 20, paragraph 9-p. 49, paragraph 9.18 p. 69, paragraph 11-p. 83, paragraph A.S.

* cited by examiner

*Primary Examiner* — Kiet Doan

(57) ABSTRACT

A method and system wherein a Voice over LTE via Generic Access (VoLGA) Access Network Controller (VANC)1 upon receiving a REGISTER and REGISTER UPDATE message from the UE1 notifies a Hand Over Selection Function node (HOSF) that a user equipment (UE) is registered in the VANC. This will only be done if the HOSF has not theretofore been notified.

14 Claims, 4 Drawing Sheets

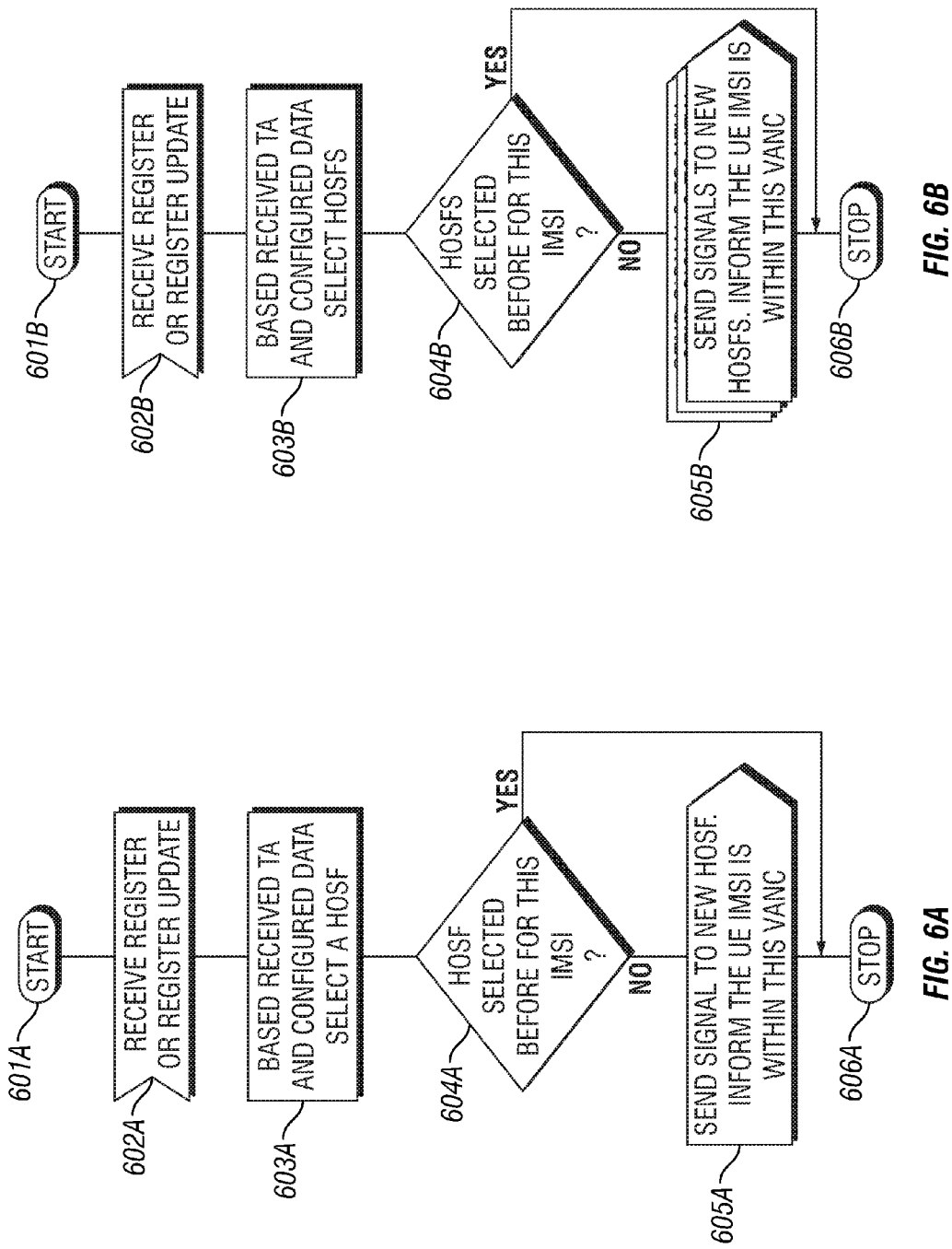

VOICE OVER LTE VIA GENERIC ACCESS HANDOVER (HO) APPARATUS AND METHOD

CROSS-REFERENCE TO RELATED APPLICATIONS

This application claims priority from U.S. Provisional Patent Application No. 61/105,623 filed Oct. 15, 2008 entitled MOBILITY SOLUTION SELECTION FOR VOICE OVER EPS; U.S. Provisional Patent Application No. 61/140,393 filed Dec. 23, 2008 entitled HANDOVER ROUTING IN CS-OVER-LTE-VIA-GAN SOLUTIONS; and U.S. Provisional Patent Application No. 61/150,041, filed Feb. 5, 2009 entitled VOICE OVER LTE VIA GENERIC ACCESS (VoLGA) ACCESS NETWORK CONTROLLER (VANC) SELECTION FOR HANDOVER (HO), each of which are hereby incorporated herein by this reference and considered a part hereof as if included herein in their entirety.

TECHNICAL FIELD

The invention relates to the field of wireless telecommunications.

BACKGROUND

As used herein, the following abbreviations shall have the following meanings:
3GPP Third Generation Partnership Project
ACM Address Complete Message
BSS Base Station Subsystem
CAMEL Customized Applications for Mobile networks Enhanced Logic
CDMA Code Division Multiple Access
CS Circuit Switched
DTM/PSHO Dual Transfer Mode/Packet Switched Handover
EPS Evolved Packet System
E-UTRAN Evolved-UTRAN
FQDN Fully Qualified Domain Name
GAN Generic Access Network
GANC GAN Controller
GBR Guaranteed Bit Rate
GERAN GSM EDGE Radio Access Network
GSM Global System for Mobile Communications
GW Gateway
HLR Home Location Register
HO Handover
HSS Home Subscriber Server
IMS IP Multimedia Subsystem
IAM Initial Address Message
IMSI International Mobile Subscriber Identity
IP Internet Protocol
ISDN Integrated Services Digital Network
ISUP ISDN User Part
LTE Long Term Evolution
MGW Media Gateway
MM Mobility Management
MME Mobility Management Entity
MMTel Multimedia Telephony
MSC Mobile Switching Center
MSISDN Mobile Station International Subscriber Directory Number
Non-GBR Non-Guaranteed Bit Rate
O&M Operations and Maintenance
PS Packet Switched
QCI QoS Class Identifier
RAN Radio Access Network
SDP Session Description Protocol
SES Send End Signal
SGSN Serving GPRS Support Node
SRVCC Single Radio Voice Call Continuity
STN-SR Station Transfer Number for SRVCC
TAU Tracking Area Update
UE User equipment
UMTS Universal Mobile Telecommunications System
UNI User Network Interface
UTRAN UMTS Radio Access Network
VANC VoLGA Access Network Controller
VCC Voice Call Continuity
VoIP Voice over Internet Protocol
VoLGA Voice Over LTE via Generic Access
WCDMA Wideband CDMA The 3rd Generation Partnership Project (3GPP) is a collaboration among groups of telecommunications associations, to make a globally applicable third generation (3G) mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture. The project was established in December 1998.

The 3GPP Specification provides different methods to support a voice service via Evolved Packet System (EPS). One is Internet Protocol (IP) Multi-media Subsystem (IMS) Multimedia Telephony (MMTel) which may be required to use Single Radio Voice Call Continuity (SRVCC) if there are no Voice over Internet Protocol (VoIP) over Packet Switched (PS) radio bearers in the wide area network. SRVCC supports IMS Voice with a mechanism to move the GSM, Wideband Code Division Multiple Access (WCDMA) or cdma2000 1xRTT access and support voice service using a Circuit Switched (CS) bearer rather than a packet bearer which is the primary choice for an IMS based voice service.

Another method to support a voice service via EPS is CS fallback wherein the user has access to the voice service while being connected to the Long Term Evolution (LTE) access, but the voice service is provided by an access that has (native) support for a CS voice service, i.e. GSM, WCDMA, or cdma2000 1xRTT. Furthermore, there are industry initiatives to improve CS fallback by re-using some of the SRVCC mechanisms. However, re-using standardized methods provided by 3GPP may create conflicts among the different methods.

There are a number of disadvantages with each of these methods. The service level of IMS has not reached the level of functionality that is present in the CS network currently. CS fallback does not use LTE radio resources for the CS service, and requires longer call setup time than that of conventional CS networks.

To remedy these disadvantages, several methods of operating the CS service over LTE have been proposed. One of these methods re-uses Generic Access Network (GAN) architecture. GAN allows the CS services to be operated over a generic IP access and internet, e.g. provided over a WLAN. To support handover, the terminal is assumed to use two (2) radios, one for the macro network and one for the IP access network. Such is not the case when applied in LTE. In that situation, only one radio is assumed, as only one RAT can be used at one instance in time. To operate, as noted above, mechanisms from SRVCC are re-used.

A forum, Voice over LTE via Generic Access (VoLGA) has formed to specify how to make traditional GSM/Universal Mobile Telecommunications System (UMTS) CS services available to User Equipment (UE) accessing the EPS network via LTE. The VoLGA service resembles the 3GPP GAN. GAN provides a controller node, the GAN controller (GANC), inserted between the IP access network (i.e., the EPS) and the 3GPP core network. The GAN provides an overlay access between the terminal and the CS core without requiring specific enhancements or support in the network it traverses. This provides a terminal with a "virtual" connection to the core network. The terminal and network thus reuse most of the existing mechanisms, deployment and operational aspects of the network. GAN services and objectives are reused in VoLGA wherever beneficial.

For VoLGA, all signalling and user plane traffic is fully transparent to the EPS access network on the User Network Interface (UNI). This means that the EPS regards all VoLGA traffic as normal user plane traffic occurring over suitable EPS bearers. It also implies that the UE must attach to the EPS first before any VoLGA traffic can occur. VoLGA specific support may be added to the EPS if required to ensure a complete solution.

An important distinction between VoLGA services and GAN services exists. VoLGA only supports access to CS services, not PS services. Unlike GAN, VoLGA does not support packet access to the 2G/3G Serving GPRS Support Node (SGSN). Instead, PS services are provided to the VoLGA enabled UE by directly employing the EPS system without any additional entities or functions related to VoLGA, other than the capability for combined Handover (HO) of voice, FAX, data, etc., and non-voice packet bearers. There is no impact on the PS service delivery onto the EPS UE from VoLGA. FIG. 1 shows the proposed architecture 100 for VoLGA at present including the VoLGA Access Network Controller (VANC) 101 as further explained herein. As noted hereinbefore, there are disadvantages to re-using SRVCC mechanisms. HOs from LTE to 2G/3G for VoLGA based on using SRVCC procedures are described below. To accomplish this, the network must in some way handle coexistence as described elsewhere in the art and is outside the scope of this application. Once it is determined known that a HO is for VoLGA, the VANC 101 where the UE 102 is registered must be found. The VANC 101 that is conventionally selected is based on the Tracking Area ID and load balancing algorithms. Mobility Management Entity (MME) 103 only uses target cell identity to select a HO peer. The data present in the HO signaling is not helpful to any other peer, for example a Hand Over Selection Function (HOSF) to select the correct VANC 101.

To address this issue, a number of proposed contributions have been made in VoLGA forum. All of the contributions include methods to inform the MME to which VANC a potential HO should be targeted. A problem arises however as such methods affect the MME, and hence, the MME of 3GPP release 8 cannot be used.

To further explain the context of the invention, reference is made to FIG. 2, which is the SRVCC architecture for the Evolved UTRAN (E-UTRAN) to 3GPP UMTS Radio Access Network (UTRAN)/GSM EDGE Radio Access Network (GERAN) and FIG. 3 is a call flow diagram 300 for SRVCC from E-UTRAN to GERAN without Dual Transfer Mode/Packet Switched Handover (DTM/PSHO) support.

As seen in FIG. 3:

Step 301. Based on UE measurement reports the source E-UTRAN decides to trigger an SRVCC handover to GERAN.

Step 302. Source E-UTRAN sends Handover Required (Target ID, Source to Target Transparent Container) message to the source MME. The E-UTRAN also indicates to the MME that this is an SRVCC handover operation.

Step 303. Based on the QoS Class Identifier (QCI) associated with the voice bearer (QCI 1) and the SRVCC handover indication, the source MME splits the voice bearer from the non voice bearers and initiates the PS-CS handover procedure for the voice bearer only towards Mobile Switching Center (MSC) Server.

Step 304. The MME sends a Forward Relocation Request (Station Transfer Number for SRVCC (STN-SR), Mobile Station International Subscriber Directory Number (MSISDN), Source to Target Transparent Container, Mobility Management (MM) Context) message to the MSC Server. The MSC server is selected based on the Target ID received in the Handover Required message. The MME received STN-SR and MSISDN from the HSS as part of the subscription profile downloaded during the E-UTRAN attach procedure. The MM Context contains security related information. CS security key is derived by the MME from the E-UTRAN/EPS domain key as defined in TS 33.401. The CS Security key is sent in the MM Context.

Step 305. The MSC Server interworks the PS-CS handover request with a CS inter-MSC handover request by sending a Prepare Handover Request message to the target MSC.

Step 306. The Target MSC performs resource allocation with the target BSS by exchanging Handover Request/Acknowledge messages.

Step 307. Target MSC sends a Prepare Handover Response message to the MSC Server.

Step 308. The establishment of circuit connection between the target MSC and the Media Gateway (MGW) associated with the MSC Server e.g. using the ISDN User Part (ISUP) Initial Address Message (IAM) and Address Complete Message (ACM) messages.

Step 309. The MSC Server initiates the Session Transfer by using the STN-SR e.g. by sending an ISUP IAM (STN-SR) message towards the IMS. Standard IMS Service Continuity procedures are applied for execution of the Session Transfer, see TS 23.292 and TS 23.237. During the execution of the Session Transfer procedure the remote end is updated with the Session Description Protocol (SDP) of the CS access leg. The downlink flow of VoIP packets is switched towards the CS access leg at this point.

NOTE 1: If the MSC Server is using an ISUP interface, then the initiation of the session transfer may fail if the subscriber profile including Customized Applications for Mobile networks Enhance Logic (CAMEL) triggers is not available prior handover (see clause 7.3.2.1 in TS 23.292).

Step 310. MSC Server sends a Forward Relocation Response (Target to Source Transparent Container) message to the source MME. Source MME knows that at the end of the PS-CS handover the non-Guaranteed Bit Rate (non-GBR) bearers should be preserved.

Step 311a. Source MME sends a Handover Command (Target to Source Transparent Container) message to the source E-UTRAN. The message includes information about the voice component only.

Step 312. Source E-UTRAN sends a Handover from E-UTRAN Command message to the UE.

Step 313. Handover Detection at the target Base Station Subsystem (BSS).

Step 313a. The UE starts the Suspend procedure specified in TS 23.060 [10], clause 16.2.1.1.2. This triggers the Target SGSN to send a Suspend Request message to the Source MME. The MME returns a Suspend Response to the Target SGSN, which contains the MM and PDP contexts of the UE. The MME also starts the preservation of non-GBR bearers and the deactivation of the voice bearer.

Step 314. Target BSS sends a Handover Complete message to the target MSC.

Step 315. Target MSC sends a Send End Signal (SES) HO complete message to the MSC Server.

Step 316. Completion of the establishment of the circuit connection between the MSC and the MGW associated with the MSC Server is completed e.g. with the target MSC sending ISUP Answer message to the MSC Server.

Step 317. MSC Server sends a Forward Relocation Complete message to the source MME, informing it that the UE has arrived on the target side. Source MME acknowledges the information by sending a Forward Relocation Complete Acknowledge message to the MSC Server.

Step 318. MSC Server may perform a MAP Update Location to the Home Subscriber Server/Home Location Register (HSS/HLR) if needed. This may be needed for MSC Server to receive GSM Supplementary Service information and routing of mobile terminating calls properly in certain configuration. This Update Location is not initiated by the UE.

After the CS voice call is terminated and if the UE is still in GERAN, then (as specified in TS 23.060) the UE shall resume PS services by sending a Routing Area Update Request message to the SGSN. The Update Type depends on the mode of operation of the GERAN network, e.g. in mode I a Combined RA/LA Update is used and in mode II or III Routing Area Update is used.

SUMMARY

The following presents a summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In Applicant's co-pending application, U.S. Ser. No. 61/105,623, applicant discloses an apparatus and method that has not impact on MME. In such application, a Hand over Selection Function (HOSF) node, which could be a separate entity or included in MME or VANC is disclosed. The invention builds upon, and improves the HOSF of that application. A HOSF comprises a microprocessor circuit and associated memories with busses coupling them that configured to perform the steps described herein. The VANC is a microprocessor controller circuit and associated memories and busses coupling them that are configured to perform the steps described herein.

In the invention, the VANC, upon receiving REGISTER and REGISTER UPDATE messages from the UE, notifies a HOSF that a UE is registered in said VANC. This will only be done if the HOSF has not theretofore been notified. It is assumed that the UE performs a REGISTER UPDATE at every Tracking Area Update (TAU), including at TAUs that occur during HO. If there are several HOSFs, the VANC will either inform every HOSF or it will select one or a few HOSF(s) based on the Tracking Area in which the UE resides within.

BRIEF DESCRIPTION OF THE DRAWINGS

In the following section, the invention will be described with reference to exemplary embodiments illustrated in the figures, in which:

FIGS. 6A and 6B are flow charts further illustrating the steps of the embodiment.

DETAILED DESCRIPTION

As used herein, a HOSF is a microprocessor circuit and associated memories with busses coupling them that configured to perform the steps described herein. The VANC is a microprocessor controller circuit and associated memories and busses coupling them that are configured to perform the steps described herein.

Figure 1:
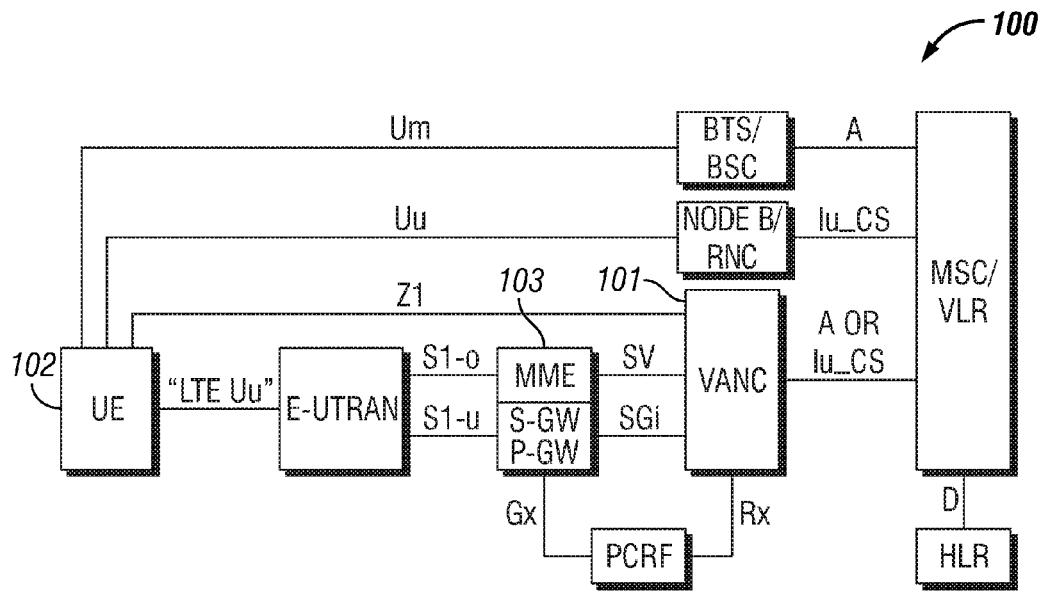
FIG. 1 illustrates the proposed architecture for VoLGA at present for the invention.
Figure 2:
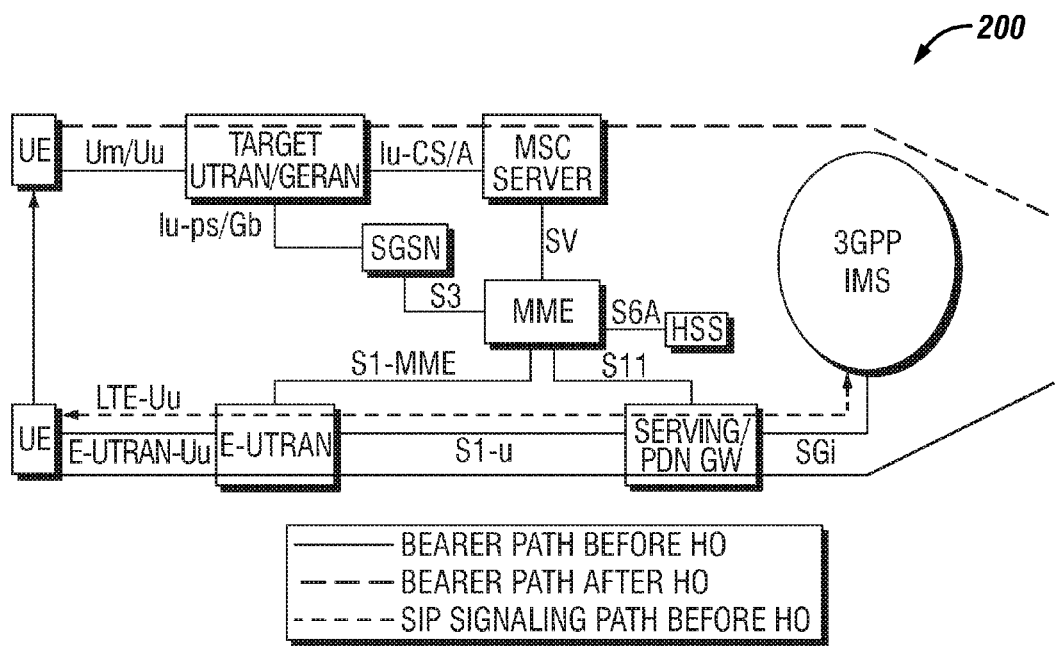
FIG. 2 illustrates the SRVCC architecture for E-UTRAN to 3GPP UTRAN/GERAN.
Figure 3:
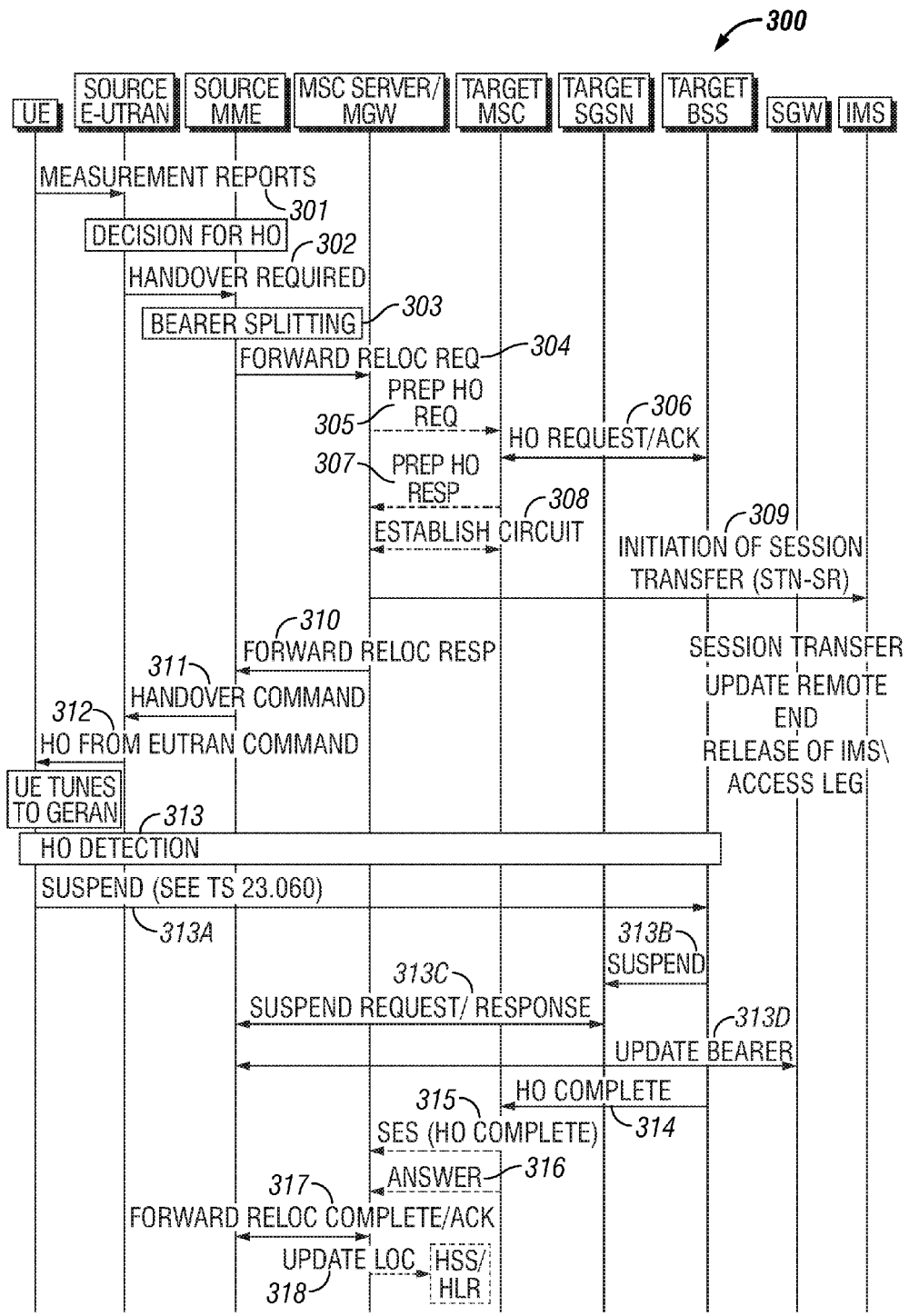
FIG. 3 is a call flow for SRVCC from E-UTRAN to GERAN without DTM/PSHO support.
Figure 4:
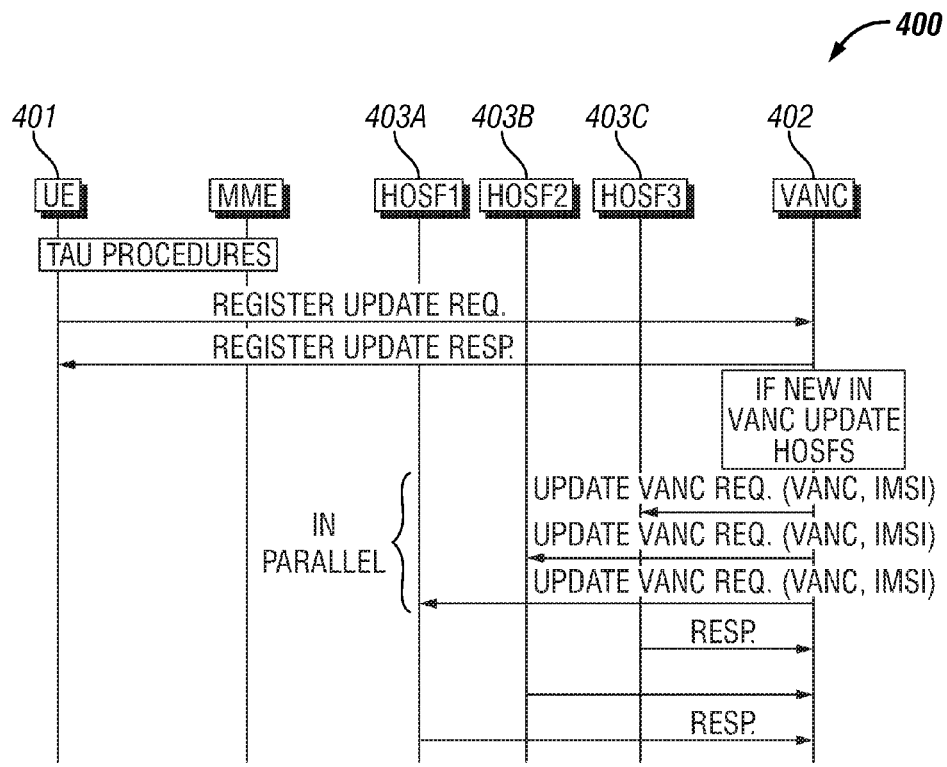
FIG. 4 illustrates the elements of an embodiment of the invention.

Referring to FIG. 4, an embodiment of the invention is shown. As seen therein, an LTE Attachment or TAU will trigger UE 401 to start the REGISTER or REGISTER UPDATE procedure. The UE 401 may not start the REGISTER or REGISTER UPDATE procedures during an active call. The VANC 402 will upon receiving the REGISTER or REGISTER UPDATE check if a plurality of HOSFs 403a-n (shown as HOSF 1-3), have been informed before that the UE 401 is registered to the VANC 402. If not, the VANC 402 will send data with the VANC name/address and International Mobile Subscriber Identity (IMSI) of the UE 401, all in parallel, to the plurality of HOSFs 403a-n in the network. The addresses of each of the plurality of the HOSFs are provisioned via Operations and Maintenance (O&M) activity. The addresses could either be IP addresses or Fully Qualified Domain Names (FQDNs). Each of the plurality of HOSFs acknowledge the request with a response.

The method of the first embodiment are the steps of triggering, by an LTE Attachment or TAU, a UE 401 to start the REGISTER or REGISTER UPDATE procedure, provided the UE 401 may not start the REGISTER or REGISTER UPDATE procedures during an active call; then checking, by the VANC 402, upon receiving the REGISTER or REGISTER UPDATE, if a plurality of HOSFs 403A, 403B, 403C, have theretofore been notified that the UE 401 is registered to the VANC 402. If not, then the next step is sending, by the VANC 402, data with the VANC name/address and IMSI of the UE 401, all in parallel, to the plurality of HOSFs 403A, 403B, 403C in the network. To accomplish this step, the step also includes provisioning the addresses of each of the plurality of the HOSFs via O&M activity. In such case, the addresses could either be IP addresses or FQDNs. The final step is acknowledging, by each of the plurality of HOSFs, the request with a response.

Figure 5:
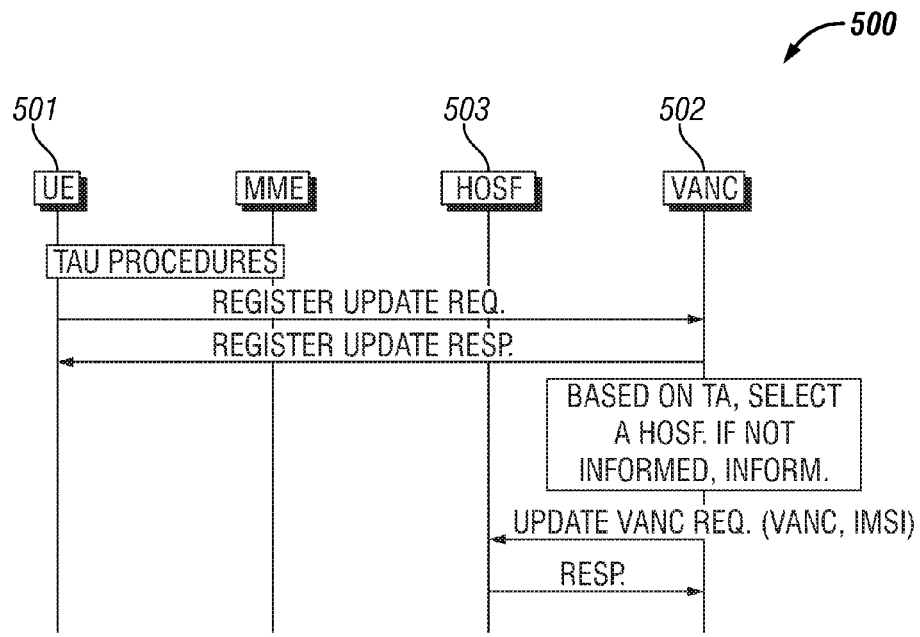
FIG. 5 illustrates the elements of another embodiment of the invention.

FIG. 5 illustrates another embodiment 500 of the invention. As seen therein, an LTE Attachment or Tracking Area Update (TAU) will trigger the UE 501 to start the registration/registration update procedure. The UE 501 will start the registration update procedures during an active call, thus at every HO, if there is a TAU, the registration update procedures will start. The VANC 502 will, upon receiving a REGISTER and REGISTER UPDATE, select a HOSF 503 based on the TA ID received. Note that the TA will have 2G/3G neighbors that an eNB will select for HO targets. The VANC 502 will then check if the selected HOSF 503 has been theretofore notified that UE 501 is registered to said VANC 502. If not so notified, VANC 502 will send a signal with the VANC name/address and IMSI of the UE 501 to the selected HOSF 503. The address of the HOSFs in the network and the TA 2G/3G neighboring cell relation are pre-provisioned via O&M activity. The addresses could either be IP addresses or FQDNs. The HOSFs then acknowledge the request with a response.

The handover procedures are then performed as in the IMS based solution without database as disclosed in Applicant's co-pending patent application U.S. Ser. No. 61/105,623. As disclosed therein, at HO to 2G/3G, the MME will, based on target cell, select a HOSF (instead of an MSC as in SRVCC), then the HOSF will determine at which VANC the UE is registered, and forward the HO signaling to that VANC. The HOSE does this based on the IMSI received in the first phase as disclosed therein. All HO signaling will pass the HOSF for this HO.

Referring to FIG. 6A, the method starts at step 601A. At step 602A, the REGISTER or REGISTER UPDATE is received at the VANC. At step 603A, the VANC will select a HOSE based on received TA and configured data. At step 604A, it will check if the HOSF has already been informed about the UE's whereabouts, via its IMSI. If so, the VANC will not contact the selected HOSF, and the method will stop at step 606A, otherwise, at step 605A, the VANC will signal the HOSF to inform that the UE is registered within this VANC.

Referring to FIG. 6B, the method starts at step 601B. At step 602B, the REGISTER or REGISTER UPDATE is received at the VANC. At step 603B, the VANC will select a number of HOSFs based on received TA and configured data. At step 604B, it will check if these HOSFs have already been informed about the UE's whereabouts, via its IMSI. If so, the VANC will not contact the selected HOSFs and the method will stop at step 606B, otherwise, at step 605B, the VANC will signals to all the selected HOSFs in parallel to inform that the UE is registered within this VANC.

The invention may be realized in hardware, software, or a combination of hardware and software. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of facilitating a handover (HO) of a user equipment (UE) in a wireless system, comprising the steps of:
   triggering, by a Long Term Evolution (LTE) Attachment or Tracking Area Update (TAU), a UE to start a REGISTER or REGISTER UPDATE procedure;
   sending the REGISTER or REGISTER UPDATE to a Voice over LTE Generic Access (VoLGA) Access Network Controller (VANC);
   checking, by the VANC, upon receiving the REGISTER or REGISTER UPDATE, if a plurality of LTE HO selection functions (HOSFs) have theretofore been notified that the UE is registered to the VANC, and if not, then sending, by the VANC, data with a VANC name/address and an International Mobile Subscriber Identity (IMSI) of the UE, all in parallel, to the plurality of LTE HOSFs; and
   acknowledging, by each of the plurality of LTE HOSFs, receipt of the data with a response.

2. The method of claim 1, wherein the UE cannot start the REGISTER or REGISTER UPDATE procedure during an active call.

3. The method of claim 1, wherein the step of sending, by the VANC, data with the VANC name/address and IMSI of the UE, all in parallel, to the plurality of LTE HOSFs further includes the step of provisioning addresses of each of the plurality of LTE HOSFs from an Operations and Maintenance (O&M) node.

4. The method of claim 3, wherein the addresses could either be Internet Protocol (IP) addresses or Fully Qualified Domain Names (FQDNs).

5. The method of claim 1, wherein the UE is triggered to commence the REGISTER or REGISTER UPDATE procedure during an active call.

6. The method of claim 5, wherein at every HO, if there is a TAU, the REGISTER or REGISTER UPDATE procedure will commence.

7. The method of claim 6, wherein the VANC will, upon receiving a REGISTER or REGISTER UPDATE, select a LTE HOSF from the plurality of LTE HOSFs based on a Tracking Update (TA) Identity (ID) received.

8. A system for facilitating the handover (HO) of a user equipment (UE), comprising:
   a node operable to trigger, by a Long Term Evolution (LTE) Attachment or Tracking Area Update (TAU), a UE to start a REGISTER or REGISTER UPDATE procedure;
   a UE operable to send the REGISTER or REGISTER UPDATE to a Voice over LTE Generic Access (VoLGA) Access Network Controller (VANC);
   the VANC operable to check upon receiving the REGISTER or REGISTER. UPDATE, if a plurality of LTE HO selection functions (HOSFs) have theretofore been notified that the UE is registered to the VANC, and if not, then sending, by the VANC, data with a VANC name/address and an International Mobile Subscriber Identity (IMSI) of the UE, all in parallel, to the plurality of LTE HOSFs; and
   the plurality of LTE HOSFs operable to acknowledge receipt of the data with a response.

9. The system of claim 8, wherein the UE cannot start the REGISTER or REGISTER UPDATE procedure during an active call.

10. The system of claim 8, wherein the VANC is operable to send data with the VANC name/address and IMSI of the UE, all in parallel, to the plurality of LTE HOSFs and is further operable to provision addresses of each of the plurality of LTE HOSFs from an Operations and Maintenance (O&M) node.

11. The system of claim 10, wherein the addresses could either be Internet Protocol (IP) addresses or Fully Qualified Domain Names (FQDNs).

12. The system of claim 8, wherein the UE is triggered to commence the REGISTER or REGISTER UPDATE procedure during an active call.

13. The system of claim 12, wherein at every HO, if there is a TAU, the REGISTER or REGISTER UPDATE procedure will commence.

14. The system of claim 13, wherein the VANC will, upon receiving a REGISTER and REGISTER UPDATE, select a LTE HOSE from the plurality of LTE HOSFs based on a Tracking Update (TA) Identity (ID) received.

* * * * *